Dec. 9, 1969   R. W. JONES   3,482,747
FISH STRINGER
Filed April 23, 1968

INVENTOR.
ROBERT W. JONES
BY *Head & Johnson*
ATTORNEYS 3,482,747
FISH STRINGER
Robert W. Jones, 1805 Oak Ridge Drive,
Seminole, Okla. 74868
Filed Apr. 23, 1968, Ser. No. 723,514
Int. Cl. A45f *3/00;* B65d *71/02*
U.S. Cl. 224—7
4 Claims

ABSTRACT OF THE DISCLOSURE

This invention relates to a floating fish stringer. More particularly, the invention includes a floating fish stringer having an elongated body member of floatable plastic material, a wire member partially encompassed by said body member and of a configuration providing a plurality of spaced apart U-shaped hook portions extending substantially radially of the longitudinal axis of the body member, each of the U-shaped hook portions extending exterior of the body member, the wire member including an end loop at one end thereof coaxial of and exterior of the body member providing means for receiving a flexible stringer retaining member, and a fish retaining hook received by each of the U-shaped hook portions.

CROSS-REFERENCE

This invention is not related to any pending United States or foreign patent applications.

SUMMARY

The use of stringers for maintaining caught fish in live condition is well known. The typical stringer in present use includes a chain or rope device having a plurality of safety pin type hooks attached to it in one way or another. As the fisherman catches fish he places them on the safety pin hooks by opening the hooks and extending a portion through the lips or the jaws of the fish. This present type of stringer is satisfactory except that it permits fish to go deep into the water in which they are placed, the only limitation being the length of the fish stringer. Occasionally fish on a present type stringer tied to a motor boat becomes tangled in the boat propeller. In addition, when the present fish stringer is attached to a boat the fish occasionally become trapped between the bottom of the boat and the bank or shore resulting in the fish being crushed by the boat.

This invention provides a fish stringer of a floating type which prevents fish from becoming entangled in a boat propeller or becoming trapped under a boat between it and a bank or shore.

An important aspect of this invention is the economical means provided of manufacturing and assembling a floating fish stringer.

DESCRIPTION OF VIEWS

DETAILED DESCRIPTION

Figure 1:
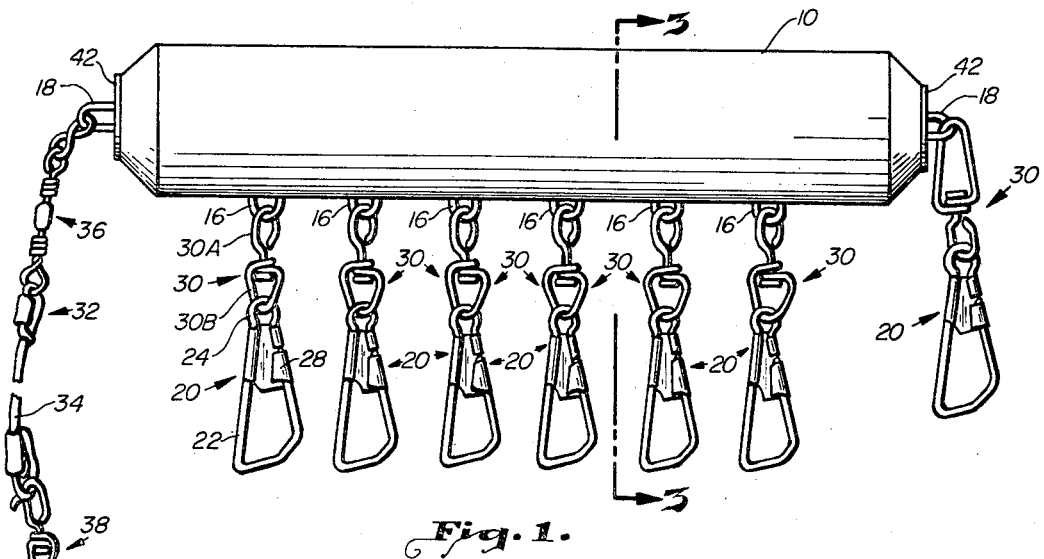
FIGURE 1 is an external view of an embodiment of the fish stringer of this invention.

Referring now to the drawings and first to FIGURE 1, the fish stringer of this invention includes an elongated body member of floatable plastic material 10. The body member 10 may be of most any configuration although the elongated arrangement is desirable and it is preferably cylindrical in cross section so as to offer minimum resistance as it passes through the water. The cylindrical cross-sectional configuration of the body member is, however, not imperative. The floatable plastic body member 10 can be formed of several of the new types of foam plastics available, however, of the materials presently available, polyurethene foam is highly successful because of its high floatation characteristics, durability, flexibility, and economy.

Figure 2:
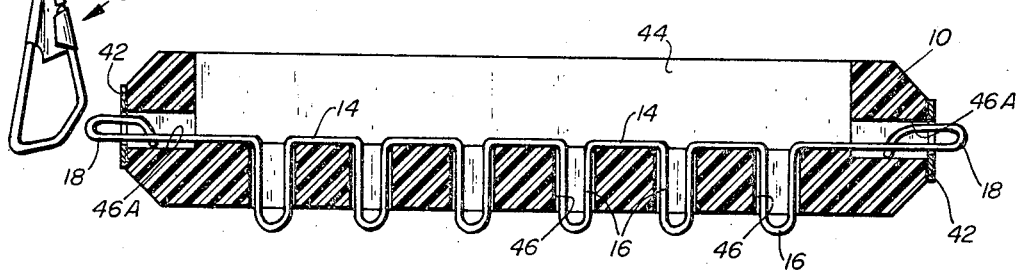
FIGURE 2 is a longitudinal cross-sectional view of the fish stringer of this invention.

The second major portion of the new fish stringer of this invention is a wire member, best shown in FIGURE 2, identified by the numeral 14. The wire member 14 is substantially encompassed by the plastic body portion 10. The wire member 14 is of a configuration providing a plurality of spaced apart U-shaped hook portions 16. The U-shaped hook portions 16 extend radially of the longitudinal axis of the body portion 10 and are positioned so that at least a portion of each of the U-shaped hook portion 10 extends exterior of the body member. In the illustrated arrangement a portion of each of the U-shaped hook portions 16 extends fully exteriorly of the body member 10 although it can be seen that if preferred, the body member could be slightly recessed surrounding each of the U-shaped portions and thereby the U-shaped portions 16 would not be required to extend beyond the normal circumferential surface of the body 10.

In addition, the wire member 16 is configured to provide a loop 18 at each end which extends exteriorly of and substantially coaxially of the body member 10.

A fish retaining hook 20 is affixed to each of the U-shaped portions 16. The fish retaining hook 20 is preferably of the safety pin type as shown. Each safety pin type hook includes an elongated spring wire 22 forming a loop 24 at one end. A sheet metal shroud 26 is formed around the spring wire adjacent the loop 24 and includes a folded catch portion 28. The free end of the wire 22 is received in the catch portion 28. When desired to place a fish on the hook 20 the free end is removed from catch portion 28 and is run through the lips or mouth of the fish. The free end is then placed back within the confines of catch portion 28.

In the preferred arrangement the stringer includes the additional element of a swivel 30 positioned between each of the wire member U-shaped portions 16 and the complementary fish retaining hook 20. In the typical arrangement, each of the swivels 30 includes a loop portion 30A and a loop portion 30B swivelably connected to each other. Each loop portion 30A receives a U-shaped wire portion 16 and each loop portion 30B receives a loop 24 of a fish retainer hook 20.

It is understood that the safety pin type retainer hook 20 and swivel 30 are of well known construction and the actual arrangement of these elements, while functioning as a part of the overall invention, do not within themselves constitute a part of the unique or novel features of the invention.

A flexible stringer retaining member 32 is affixed to one of the end hooks 18. The stringer retainer member 32 may consist of a short length of chain, or as illustrated, of rope 34. In the preferred arrangement the stringer retainer member includes swivels 36 and 38 and a safety pin type hook 40 at the end thereof providing means of securing the stringer to a boat or the like.

To prolong the life of the stringer of this invention washers 42 may be provided at each end of the body member 10, each having an opening therethrough receiving an end hook 18. Washers 42 are preferably of stiff plastic.

Figure 3:
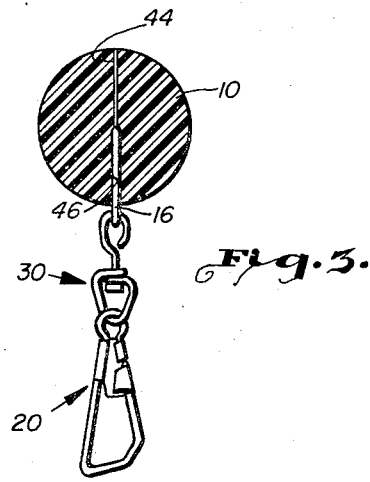
FIGURE 3 is a cross-sectional view taken along the lines 3—3 of FIGURE 1.

The stringer of this invention may be manufactured in a variety of ways. In one arrangement the plastic body portion 10 may be molded around the wire member 14. In another arrangement, as best illustrated in FIGURES 2 and 3, an elongated body member 10 may be provided with a longitudinal slit 44 extending in the plane of the axis and of length less than the length of the body so that the portions near the end of the body are not slit. Holes 46 can then be formed in the body 10 to receive the U-shaped portions 16. Holes 46A may likewise be provided for receiving the end loops 18. The wire member 14 can be bent so as to permit the insertion of the end loops 18 through end openings 46A and likewise the U-shaped portions 16 may then be urged through openings 46 so that the end portion of each of the U-shaped portions extend externally of the body member.

In the illustrated arrangement an end loop 18 is provided at each end of the wire member 14. As already discussed, one of the end loops 18 is utilized for receiving a stringer retainer member 32. The opposite end loop 18 may be utilized for an additional fish retainer hook 20, with a swivel 30 so as to provide capacity for one additional fish. Where it is desired to provide the facilities for stringing a greater number of fish it can be seen that the floating stringers may be connected in series.

While the invention has been described with a certain degree of particularity, it is manifest that many changes may be made in the details of construction and the arrangement of components without departing from the spirit and scope of this disclosure.

What is claimed:
1. A fish stringer comprising:
   an elongated body member of floatable plastic material;
   a wire member partially encompassed by said body member and of a configuration providing a plurality of spaced apart U-shaped hook portions extending substantially radially of the longitudinal axis of the body member, each of said U-shaped hook portions extending exterior of said body member, said wire member including a loop portion at one end thereof extending coaxially of the body member and exterior of the surface of one end of the body member and providing means of receiving a flexible stringer retaining member; and
   a fish retaining clip received at one end thereof by each of said U-shaped hook portions.

2. A fish stringer according to claim 1, including a swivel member positioned between each of said U-shaped hook portions and a said fish retaining hook, each of said swivel members having a first and second loop portion swivelly supported to each other, one of said loop portions receiving a said U-shaped wire portion and the other of said loop portions receiving one end of a said fish retaining hook.

3. A fish stringer according to claim 1 wherein said wire member is configured to provide an end loop portion at each end thereof coaxial with said floatable body portion and extending exterior the ends of said body portion.

4. A fish stringer according to claim 1 wherein said body member is provided with a longitudinal slit in the plane of the longitudinal axis, the slit extending from one surface of the body member to approximately the longitudinal center of the body and terminating adjacent each end of the body member, and including spaced apart parallel radial holes extending from the body exterior surface opposite the slit intersecting the slit in the center of the body and coaxial hole in one end of the body intersecting the slit, the wire member U-shaped hook portions being received by the radial holes and the wire member end loop portion being received by the coaxial hole.

References Cited
UNITED STATES PATENTS

| | | |
|---|---|---|
| 2,592,389 | 4/1952 | Budy. |
| 3,137,421 | 6/1964 | Haddock. |
| 3,302,837 | 2/1967 | Montgomery. |

GERALD M. FORLENZA, Primary Examiner

U.S. Cl. X.R.

224—45